(12) United States Patent
Check

(10) Patent No.: US 6,450,205 B1
(45) Date of Patent: Sep. 17, 2002

(54) HOSE OR TUBING PROVIDED WITH AT LEAST ONE COLORED INNER PARTITION

(75) Inventor: Bryan J. Check, East Brunswick, NJ (US)

(73) Assignee: Vital Signs, Inc., Totowa, NJ (US)

( * ) Notice: Subject to any disclaimer, the term of this patent is extended or adjusted under 35 U.S.C. 154(b) by 0 days.

(21) Appl. No.: 09/668,813

(22) Filed: Sep. 23, 2000

(51) Int. Cl.⁷ ................................................. F16L 11/00
(52) U.S. Cl. ....................... 138/116; 138/104; 138/121
(58) Field of Search .............................. 138/116, 115, 138/117, 104, 121

(56) References Cited

U.S. PATENT DOCUMENTS

| | | | | |
|---|---|---|---|---|
| 2,624,366 A | * | 1/1953 | Pugh | 138/115 |
| 2,916,055 A | * | 12/1959 | Brumbach | 138/111 |
| 3,110,753 A | * | 11/1963 | Witort | 138/116 |
| 4,275,768 A | * | 6/1981 | Riggs et al. | 138/104 |
| 4,404,958 A | * | 9/1983 | Boettcher | 126/426 |
| 4,756,339 A | * | 7/1988 | Buluschek | 138/115 |
| 5,182,954 A | * | 2/1993 | Menheere | 138/104 |
| 5,228,478 A | * | 7/1993 | Kleisle | 138/104 |
| 5,467,826 A | * | 11/1995 | Miller | 166/380 |
| 5,489,126 A | * | 2/1996 | Gray, Jr. | 138/104 |
| 5,829,485 A | * | 11/1998 | Fatato et al. | 138/110 |
| D405,522 S | * | 2/1999 | Hoenig et al. | D24/110 |
| 5,944,059 A | * | 8/1999 | Masui | 138/121 |
| 5,996,639 A | * | 12/1999 | Gans et al. | 138/115 |
| 6,394,142 B1 | * | 5/2002 | Woelfel et al. | 138/115 |
| 2002/0036019 A1 | * | 3/2002 | Woelfel et al. | 138/115 |

* cited by examiner

Primary Examiner—James Hook
(74) Attorney, Agent, or Firm—R. Gale Rhodes, Jr.

(57) ABSTRACT

Multi-lumen hose including a substantially transparent tubular member provided with at least one colored inner partition dividing the tubular member into a plurality of lumen and wherein the colored inner partition is optically perceptible through the tubular member by the human eye or by optical apparatus known to the art for recognizing color.

32 Claims, 2 Drawing Sheets

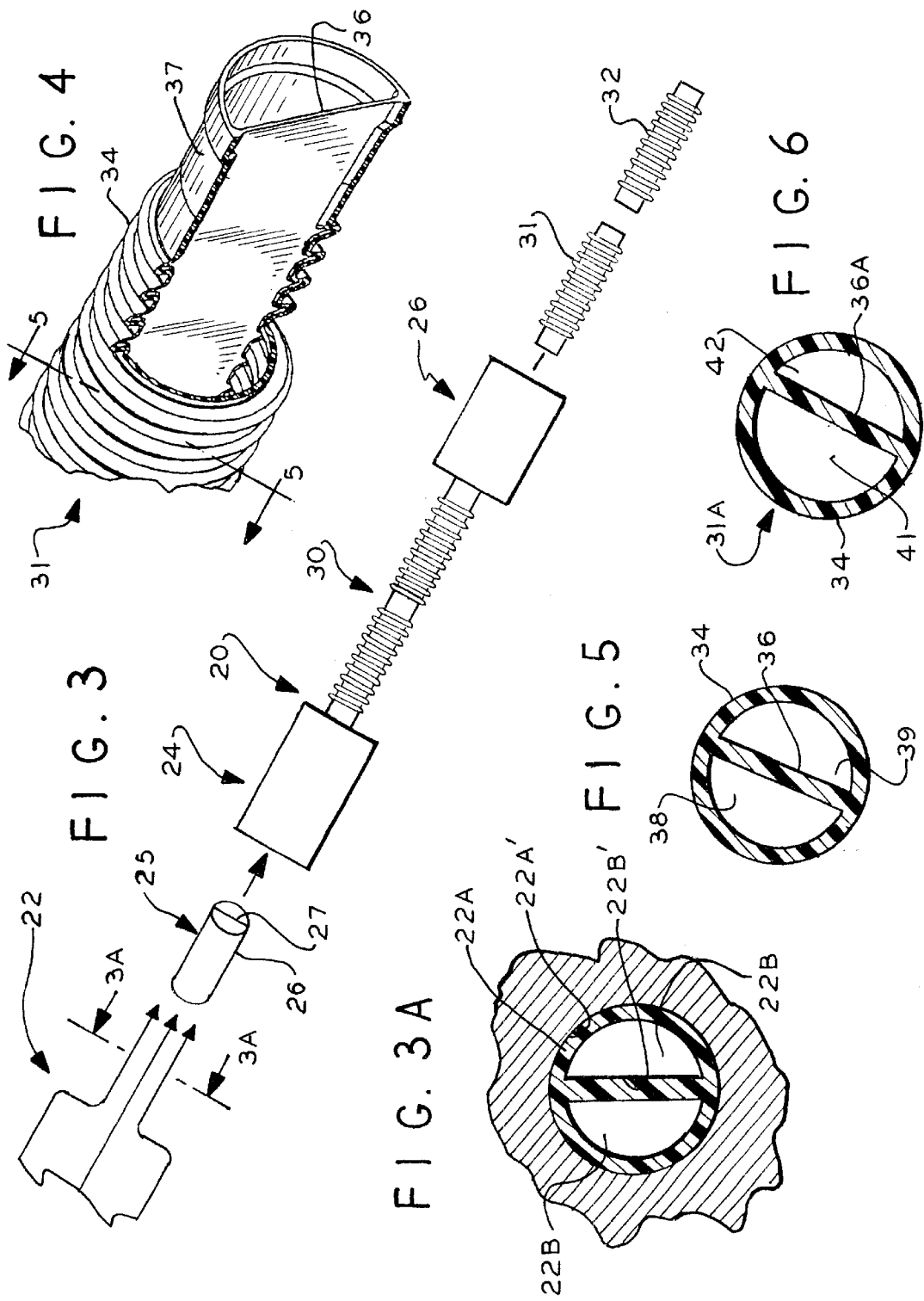

HOSE OR TUBING PROVIDED WITH AT LEAST ONE COLORED INNER PARTITION

BACKGROUND OF THE INVENTION

This invention relates generally to hose or tubing provided with at least one inner partition dividing such hose or tubing into a plurality of passageways or lumen and where there is a need to know that such inner partition is present in such tubing. More particularly, this invention relates to hose including an at least substantially transparent tubular member or peripheral wall provided with at least one colored inner partition dividing such tubular member or peripheral wall into a plurality of passageways or lumen and where such inner partition is optically perceptible through such tubular member or peripheral wall.

The terms color or colored as used herein and in the appended claims are used in the sense of a phenomenon of light, or visual perception by the eye of the human being, or optical perception by optical apparatus of the type known to the art for recognizing color, that enables the eye of a human being or such optical apparatus to differentiate otherwise identical objects.

The term optically perceptible as used herein and in the appended claims is used to include visual perception by the eye of a human being and perception by optical apparatus of the type known to the art for recognizing color.

The term at least substantially transparent as used herein and in the appended claims with regard to the present invention means that the tubular member or peripheral wall comprising the hose or tubing is sufficiently transparent to permit the at least one colored inner partition dividing the tubular member or peripheral wall into a plurality of lumen to be optically perceptible through the hose or tubing. It will be further understood that the term at least substantially transparent as used herein and in the appended claims with regard to the tubular member or peripheral wall means that the tubular member or peripheral wall also may be colored but if colored will still be sufficiently transparent to permit the colored inner partition to be optically perceptible therethrough. The colored substantially transparent tubular member or peripheral wall may be of a first color and the colored inner partition may be of a second color or the colored substantially transparent tubular member or peripheral wall and inner partition may be of the same color but with the inner partition being of a darker same color such that it is optically perceptible through the colored tubular member or peripheral wall.

Still more particularly, this invention relates to multi-lumen hose, and by way of example and not by way of limitation, dual-lumen hose of the type used to communicate anesthesia gas from an anesthesia machine or breathing gas such as oxygen, or oxygen enriched gas, from a ventilator, to a patient's mask or endotracheal tube, and thereby to the patient, and for communicating exhalation gas from the patient back to the anesthesia machine or ventilator. Flexible multi-lumen dual-lumen hose or tubing, sometimes referred to as dual air passageway or dual air passageway, hose, tubing or connector is disclosed in U.S. Pat. Nos. 5,121,74 and 5,996,639.

U.S. Pat. No. 5,121,746 entitled ANESTHETIC AND RESPIRATOR BREATHING CIRCUIT DEVICE, John R. Sikora inventor, patented Jun. 16, 1992, is incorporated herein by reference as if fully reproduced herein. The Sikora patent, FIG. 3, discloses a multi-passage or lumen flexible connector pipe (hose) 30 including outer walls 22 and 21 and an inner wall, or inner partition, 25 dividing the pipe into passages or lumen 31 and 32. As shown in FIG. 3, the outer walls of the pipe 30 are corrugated, and the inner wall or partition 25 also is corrugated. The Sikora patent teaches in connection with FIGS. 1 and 2 that anesthesia gas from the anesthetic machine 8 is communicated to the patient's mask 11 through the passage or lumen 32 provided in the pipe 30 and that exhalation gas from the patient's mask 11 is communicated back to the anesthetic machine through the passageway 31 formed in the pipe 30. In connection with FIGS. 2 and 3, the Sikora patent teaches that breathing gas, such as an enriched gaseous mixture of oxygen, is communicated to the patient's mask 11 through the passage or lumen 32 formed in the connector pipe 30 and that exhalation gas from the patient's mask 11 is communicated back to the respirator 15 through the passage or lumen 31 formed in the connector pipe 30. This patent also discloses that the dividing wall, dividing wall 25, FIG. 3, can be substantially planar dividing wall as recited in claim 1 of this patent, and which dividing wall as taught in this patent may be a substantially planar chordal dividing wall which divides the cross-section of the flexible tubular member into a larger and a smaller cross-section so as to provide first and second fluid flow paths of different sizes through the pipe (hose).

U.S. Pat. No. 5,996,639 entitled MULTIPLE COMPARTMENT CORRUGATED HOSE, Leo Gans et al., patented Dec. 7, 1999, is incorporated herein by reference as if fully reproduced herein. This patent teaches that it is an improvement over the multi-compartment hose disclosed in the Sikora patent and discloses a flexible multi-lumen hose including a corrugated peripheral wall and a corrugated inner partition. As shown in FIG. 3 of this patent, the hose 10 includes a corrugated peripheral wall 20 and a corrugated inner partition 70 dividing the hose into two lumen 50 and 60 better seen in FIG. 1.

Des. Pat. Nos. Des. 405,522 and Des. 424,687, patented Feb. 9, 2000 and May 9, 2000, respectively, disclose multiple embodiments of ornamental designs of breathing tubes for conveying oxygen or anesthesia gas to lungs and conveying exhaled gas away from lungs of a patient, Richard Hoenig inventor of both of these design patents, and these design patents are assigned to the same assignee as the present invention; these design patents are incorporated herein by reference as if fully reproduced herein.

Also known to the prior art are various ways of manufacturing corrugated hoses such as by the well-known continuous blow molding or vacuum assisted blow molding methods. One such manufacturing method, as noted in the incorporated U.S. Pat. No. 5,996,639, is described in U.S. Pat. No. 3,286,305 entitled APPARATUS FOR CONTINUOUS MANUFACTURE OF HOLLOW ARTICLES, P. H. Seckel inventor, patented Nov. 22, 1966, and which patent is incorporated herein as if fully reproduced herein.

The peripheral wall and inner partition of the typical multi-lumen prior art flexible corrugated hose are typically extruded together, from the same plastic material, and in a single pass or single extrusion from an extruder. Such multi-lumen prior art flexible hose is shown in FIG. 1 and indicated by general numerical designation 10. The hose 10 includes a corrugated tubular member or peripheral wall 12 and an inner partition, sometimes referred to in the art as a septum, 14 dividing the tubular member or peripheral wall 12 into a plurality of lumen 15 and 16; the prior art hose 10 shown in FIG. 1 includes a substantially planar inner partition 14 and it will be understood that, alternately, such prior art hose may include a corrugated inner partition as taught in the incorporated U.S. Pat. No. 5,996,639. Prior art hose 10, shown in FIG. 1, as taught above with regard to the incorporated U.S. Pat. No. 5,121,746, is useful for communicating breathing gas or anesthesia gas, from a ventilator or anesthesia machine to a patient through one lumen and for communicating exhalation gas from the patient back to the anesthesia or ventilator through the other lumen. The tubular member or peripheral wall 12 and the inner partition 14 of the prior art hose 10 of FIG. 1 typically are extruded together from a single plastic material, typically the above-noted polyethylene, and hence both the tubular member or outer peripheral wall 12 and the inner partition 14 are transparent, or at least substantially transparent, or even clear.

Also known to the prior art, as illustrated in FIG. 2, are flexible corrugated hose or tubing 18, not having an inner partition, and providing only a single lumen 19 therethrough. The single lumen prior art tubing 18 also is typically made of polyethylene and therefore is transparent, or at least substantially transparent or even clear.

As known to those skilled in the art, in some medical applications a single lumen flexible corrugated hose is required for interconnection between a patient or the patient's mask and a medical machine, and in other medical applications it is required that a multi-lumen, particularly dual lumen, flexible corrugated hose be connected between a patient, or the patient's mask and a medical machine. It has been found that when the prior art multi-lumen hose 10 of FIG. 1, having an inner partition 14, and the prior art single lumen hose 18 of FIG. 2 are present together confusion between the dual lumen hose 10 and the single lumen hose 18 can exist because the human eye cannot always see the transparent, or at least substantially transparent, inner partition 14 included in dual lumen hose 10 and a clinician, or other health provider can incorrectly connect the prior art dual lumen hose 10 (FIG. 1) between a patient and a medical machine when it is intended that the prior art single lumen hose 18 (FIG. 2) be connected between the patient and the medical machine, and the reverse can also occur. Such incorrect hose connection can produce dire consequences to the patient.

In light of the foregoing background and prior art patents, it will be understood that this invention relates more particularly to flexible, multi-lumen hose or tubing of the type known to the art for communicating breathing or anesthesia gas to a patient and for communicating the patient's exhalation gas away from the patient. Such hose or tubing is sometimes referred to in the art as breathing tube, breathing circuit tubing, hose or connector pipe, and all such terms will be referred to hereinafter and in the appended claims as hose.

Accordingly, there is a need in the art for hose having an inner partition dividing the hose into a plurality of lumen and which partition can be readily distinguished optically from single lumen hose, particularly by the visual perception of the human eye at a glance.

SUMMARY OF THE INVENTION

It is the object of the present invention to satisfy the foregoing need in the hose art.

Multi-lumen hose satisfying such need and incorporating the present invention may include a substantially transparent tubular member provided with at least one colored inner partition dividing the tubular member into a plurality of lumen and wherein the colored inner partition is optically perceptible through the tubular member by the human eye or by optical apparatus known to the art for recognizing color.

DESCRIPTION OF THE DRAWINGS

FIG. 3 is a diagrammatical illustration of method and apparatus for continuously manufacturing the multi-lumen hose of the present invention;

FIG. 3A is an illustration of the coextrusion die along the line 3A—3A in FIG. 3 in the direction of the arrows;

FIG. 4 is a partial enlarged view of multilumen hose of the present invention with a portion of the tubular member or peripheral wall of the hose being broken away to better show the colored inner partition;

FIG. 5 is a cross-sectional view taken generally along the line 5—5 in FIG. 4 and in the direction of the arrows; and FIG. 6 is a cross-sectional view similar to FIG. 5 but of an alternate embodiment of the hose of the present invention.

DESCRIPTION OF THE PREFERRED EMBODIMENT

Figure 1:
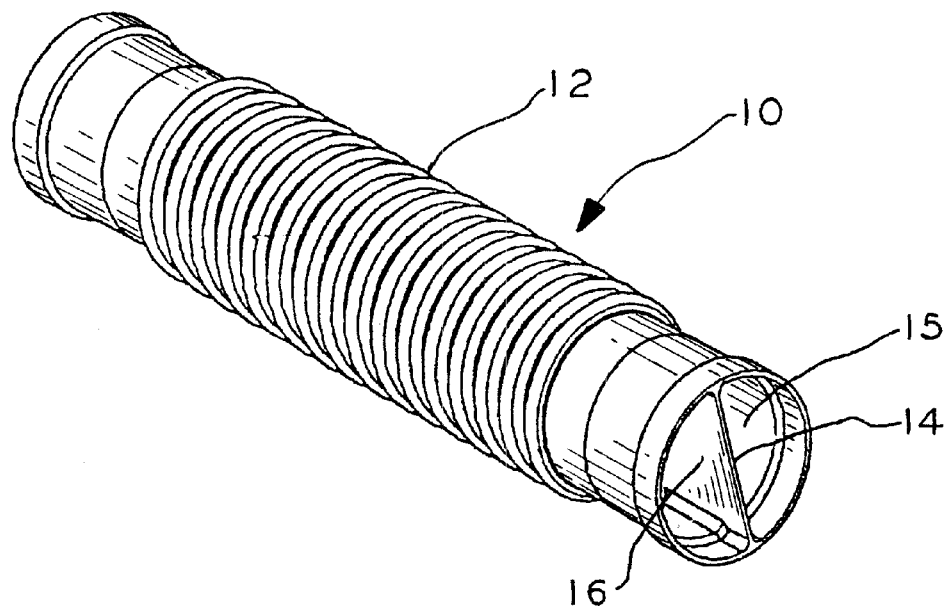
FIG. 1 is a perspective illustration of prior art flexible, corrugated hose provided with an inner partition dividing the hose into a plurality of lumen.

Referring to FIG. 3, there is shown a diagrammatical illustration of method and apparatus for continuously manufacturing the hose of the present invention. The apparatus includes a coextruder shown diagrammatically and indicated by general numerical designation 22, a corrugator shown diagrammatically and indicated by general numerical designation 24 and a cutter or cutting apparatus shown diagrammatically and indicated by general numerical designation 26. The coextruder 22 may be any coextruder known to the prior art for coextruding a hollow cylindrical outer peripheral wall from a first plastic material and for coextruding a planar, or substantially planar, inner wall from a second plastic material and which two coextrusions unite to form an integral extrusion, or what is sometimes referred to in the art as a parison, and which parison is shown in FIG. 3 and indicated by general numerical designation 25. It will be understood that in such coextrusion the tubular member or outer peripheral 26 is coextruded from a first plastic material and the inner partition 27 is coextruded form a second plastic material with the plastic materials uniting, fusing and melting together to produce an integral coextrusion, or parison 25, in the manner known to the coextrusion art. The coextruder 22 may be any suitable coextruder known to the art for producing the parison 25 described above and, which coextruders, as known to the art, include what is sometimes referred to in the art as a main extruder for extruding the tubular member or peripheral wall 26 from a first plastic material and another extruder, sometimes referred to in the art as the coextruder, for extruding the inner partition 27 from a different plastic material. The coextrusion dies of such main extruder and coextruder are shown in cross-section in FIG. 3A with the main extruder being indicated by numerical designation 22A and with the coextruder being indicated by numerical designations 22B—22B. As will be further understood from FIG. 3A, the first plastic material extruded by the main extruder 22A is extruded through the main extruder die 22A' to produce a hollow cylindrical extrusion forming the tubular member or outer peripheral wall 26 of the parison 25 (FIG. 3) and the inner or central coextruder 22B—22B is provided with a generally rectangular die 22B' through which the inner partition 27 (FIG. 3) of the parison 25 is extruded. Such main extruder may be, by way of example and not by way of limitation, a Thermatic main extruder available from the Davis-Standard company of Pawcatuck, Connecticut. The coextruder, by way of example and not by way of limitation, may be a coextruder of the Davis-Standard Company of Pawcatuck, Connecticut, Model DS125. It will be further understood in accordance with the teachings of the present invention, and referring again to the coextrusion or parison 25 of FIG. 3, that the tubular member or peripheral wall 26 may be, by way of example and not by way of limitation, coextruded from a blend of suitable plastic material such as by way of example and not by way of limitation, a blend of about 91% polyethylene and about 9% EVA, causing such tubular member or peripheral wall 26 to be at least substantially transparent, and that the inner partition coextrusion 27 may be coextruded from a suitable blend of plastic material such as by way of example and not by way of limitation, a blend of about 81% polyethylene, about 1% EVA containing a blue colorant, and about 18% EVA, causing the coextruded inner partition 27 FIG. 3) to be colored blue. Alternatively, it will be understood, that the coextruded plastic material comprising the inner partition 27 (FIG. 3) may be from the same blend wherein the colored EVA instead of containing a blue colorant may contain a red, green, yellow colorant, or other colorant, to produce a different colored inner partition that is optically perceptible through the outer tubular member or peripheral wall 26.

Parison 25, FIG. 3, is fed continuously into the corrugator 24 which may be any suitable corrugator known to the art, such as for example the corrugators illustrated in FIGS. 5 and 6 of the incorporated U.S. Pat. No. 5,996,639 or, by way of further example and not by way of limitation, a corrugator available from Corma, Inc. of Toronto, Canada, Model 120HS, Vacuum. Corrugator 24 continuously corrugates the tubular member or outer peripheral wall 26 of the parison 25. And as known to the art, the corrugator 24 may also produce cuffs at predetermined spaced locations to provide opposed ends of the corrugated tubular member or peripheral wall with cuffs upon the corrugating tubing being cut by the cutter 26. After such corrugation the output from the corrugator 24 is fed continuously into a suitable cutter of the type known to the art for cutting plastic product that passes continuously therethrough. Such cutter may be any suitable cutter known to the art for cutting continuously moving plastic product and may be, by way of example and not by way of limitation, a cutter available from the Davis-Standard Company of Pawcatuck, Connecticut, Model DSC CTS 2.

The cutter 26 cuts the coextruded corrugated tubing 30 into discrete sections of multi-lumen flexible, corrugated hose, as indicated diagrammatically in FIG. 3, by numerical designations 31 and 32; In the manner known to the art, the cutter 26 cuts the corrugated tubing 30 where adjacent cuffs have been produced by the corrugator 24.

The multi-lumen flexible corrugated hose 31 embodying the present invention is shown in enlarged partial view in FIG. 4. Specifically, such hose 31 includes a corrugated tubular member or outer peripheral wall 34 and a planar, or at least substantially planar, colored inner partition 36, also shown in cross-section in FIG. 5. As described above, the tubing 31 may be provided with a cuff 37, with another cuff, not shown, being present on the opposite end of the hose or tubing 31.

Alternatively, it will be understood that the multi-lumen, flexible corrugated hose of the present invention, instead of having a planar, or at least substantially planar, colored inner partition dividing the outer peripheral wall into a plurality of lumen, two lumen in the preferred embodiment, the inner partition of the hose of the present invention may be a colored patterned or corrugated inner partition as disclosed in the incorporated U.S. Pat. No. 5,996,639, and as patterned or corrugated in the manner disclosed therein.

It will be further understood, and referring again generally to FIGS. 4 and 5, that the colored inner partition 36 of the flexible corrugated tubing 24 may be disposed diametrically with respect to the tubular member or peripheral wall 34 as shown in FIGS. 4 and 5 to provide the hose 31 with lumen 38 and 39 of equal size. Alternatively, as shown in FIG. 6, the colored inner partition may be a chordal, not diametrical, colored inner partition such as the chordal colored inner partition 36A shown in FIG. 6 with regard to alternate embodiment hose 31A so as to provide the hose with a larger lumen 41 and a smaller lumen 42.

Figure 2:
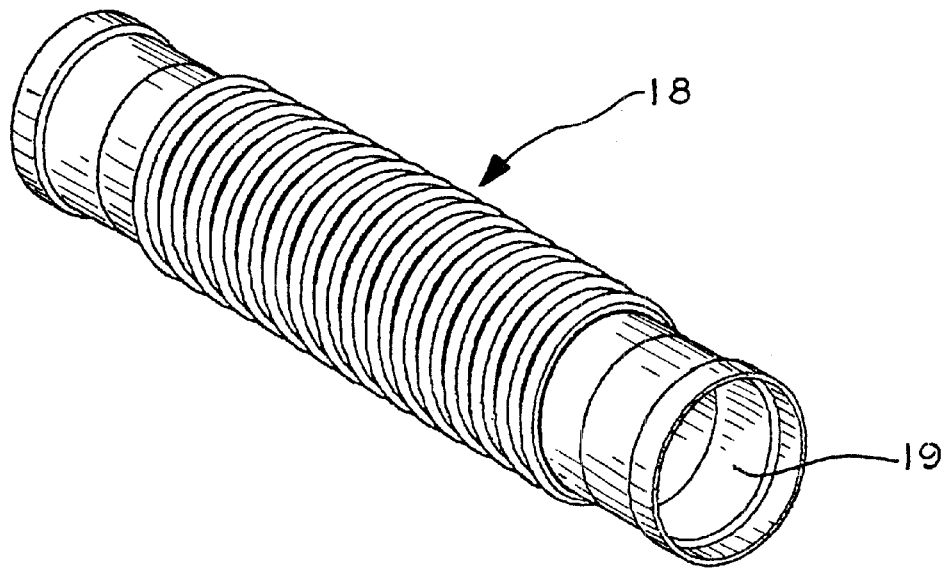
FIG. 2 is a perspective illustration of prior art single lumen, flexible corrugated hose.

In brief summary, and referring further to FIG. 4, it will be understood that in accordance with the teachings of the present invention, the tubular member or peripheral wall 34 will be transparent, or at least substantially transparent, or clear and that the colored inner partition 36, colored blue in the preferred embodiment as described above, will be optically perceptible through the tubular member or peripheral wall 34 so as to be readily and quickly visually perceptible by the human eye or recognizable by the above-noted optical apparatus known to the art for recognizing color. Thus, it will be understood that the hose of the present invention may be quickly and readily distinguished by the human eye, or by the above-noted optical apparatus known to the art for recognizing color, and easily and quickly distinguished from the single lumen prior art hose 18 shown in FIG. 2 and described above.

It will be still further understood that the hose or tubing of the present invention in addition to being particularly useful in a medical application such as interconnecting a patient between an anesthesia machine or ventilator as described above in connection with the incorporated U.S. Pat. No. 5,121,756 also may be useful in other applications, such as industrial and commercial applications, as taught in the background of the invention of the incorporated U.S. Pat. No. 5,996,639.

It will be understood by those skilled in the art that many variations and modifications may be made in the present invention without departing form the spirit and the scope thereof.

What is claimed is:

1. Multi-lumen hose for communicating a plurality of fluids, comprising an at least substantially transparent tubular member provided with at least one substantially planar colored inner partition, said tubular member and said substantially planar colored inner partition providing a plurality of lumen for communicating a plurality of fluids, said tubular member being at least substantially transparent to permit said substantially planar colored inner partition to be optically perceptible therethrough.

2. Multi-lumen hose for communicating a plurality of fluids, comprising:

a longitudinally extending, at least substantially transparent tubular member;

at least one substantially planar longitudinally extending Inner partition residing interiorly of, formed integrally with, and dividing said tubular member into a plurality of longitudinally extending lumen for communicating the plurality of fluids; and said at least one inner partition being of a color which makes it optically perceptible through said tubular member.

3. The multi-lumen hose according to claim 2 wherein said tubular member is a flexible corrugated hollow cylindrical tubular member.

4. The multi-lumen hose according to claim 2 wherein said multi-lumen hose is a dual lumen hose and wherein said at least one substantially planar longitudinally extending inner partition is a single substantially planar longitudinally extending inner partition dividing said tubular member into two lumen.

5. The multi-lumen hose according to claim 4 wherein said single substantially planar longitudinally extending inner partition is a chordal single substantially planar longitudinally extending inner partition dividing said tubular member into a larger and a smaller lumen.

6. The multi-lumen hose according to claim 4 wherein said single substantially planar longitudinally extending inner partition is disposed diagrammatically with respect to said tubular member and divides said tubular member into two lumen of equal size.

7. The multi-lumen hose according to claim 2 wherein said multi-lumen hose is a dual lumen hose and wherein said at least one substantially planar longitudinally extending inner portion is a single patterned substantially planar longitudinally extending inner partition dividing said tubular member into two lumen.

8. The multi-lumen hose according to claim 7 wherein said patterned substantially planar longitudinally extending inner partition is a chordal patterned substantially planar longitudinally extending inner partition dividing said tubular member into a larger and a smaller lumen.

9. The multi-lumen hose according to claim 7 wherein said patterned substantially planar longitudinally extending inner partition is disposed diametrically with respect to said tubular member and divides said tubular member into two lumen of equal size.

10. The multi-lumen hose according to claim 9 wherein said patterned substantially planar longitudinally extending inner partition is a corrugated longitudinally extending inner partition.

11. The multi-lumen hose according to claim 2 wherein said substantially transparent tubular member is a substantially white at least substantially transparent tubular member.

12. The multi-lumen hose according to claim 2 wherein said color is blue.

13. The multi-lumen hose according to claim 2 wherein said color is red.

14. The multi-lumen hose according to claim 2 wherein said color is green.

15. The multi-lumen hose according to claim 2 wherein said color is yellow.

16. The multi-lumen hose according to claim 2 wherein said tubular member and said at least one substantially planar longitudinally extending inner partition are made by coextrusion with said tubular member being coextruded from a first plastic material and with said at least one substantially planar longitudinally extending inner partition being coextruded from a second colored plastic material.

17. The multi-lumen hose according to claim 16 wherein said tubular member is a flexible, corrugated hollow cylindrical tubular member.

18. The multi-lumen hose according to claim 17 wherein said longitudinally extending inner partition is a substantially planar longitudinally extending inner partition.

19. The multi-lumen hose according to claim 16 wherein said at least one substantially planar longitudinally extending inner partition is an as least one substantially planar patterned longitudinally extending inner partition.

20. The multi-lumen hose according to claim 19 wherein said patterned longitudinally extending inner partition is corrugated.

21. The multi-lumen hose according to claim 2 wherein said at least one substantially planar longitudinally extending inner partition is visually perceptible to the eye of a human being through said tubular member.

22. Multi-lumen hose, comprising an at least substantially transparent tubular member provided with at least one substantially planar colored inner partition dividing said tubular member into a plurality of lumen for communicating a plurality of fluids and being optically perceptible through said tubular member.

23. The multi-lumen hose according to claim 22 wherein said at least one substantially planar colored inner partition is visually perceptible to the eye of a human being through said tubular member.

24. The multi-lumen hose according to claim 22 wherein said at least one substantially planar colored transparent partition comprises three substantially planar colored inner partitions intersecting centrally of said substantially transparent tubular member and dividing said tubular member into three lumen.

25. Multi-lumen hose for communicating a plurality of fluids, comprising:
    a longitudinally extending tubular member;
    at least one substantially planar longitudinally extending colored inner partition residing interiorly of and formed integrally with said tubular member;
    said tubular member and said colored inner partition providing a plurality of lumen through which a plurality of fluids can be communicated; and
    said tubular member being at least substantially transparent to permit said colored inner partition to be optically perceptible through said tubular member.

26. Multi-lumen hose or communicating anesthesia gas or breathing gas such as oxygen to a patient and for communicating exhalation gas away from the patient, comprising:
    an at least substantially transparent tubular member provided with at least one substantially planar colored inner partition;
    said tubular member and said colored inner partition providing a plurality of lumen for communicating the anesthesia gas or breathing gas such as oxygen to a patient and for communicating exhalation gas away from the patient; and
    said tubular member being at least substantially transparent to permit said colored inner partition to be optically perceptible therethrough.

27. Multi-lumen hose for communicating anesthesia gas or breathing gas such as oxygen to a patient and for communicating exhalation gas away from the patient, comprising:
    a longitudinally extending tubular member;
    at least one substantially planar longitudinally extending colored inner partition residing interiorly of and formed integrally with said tubular member;
    said tubular member and said colored inner partition providing a plurality of lumen for communicating the anesthesia gas or breathing gas such as oxygen to the patient and for communicating exhalation gas away from the patient; and
    said tubular member being al leas substantially transparent to permit sand colored inner partition to be optically perceptible through said tubular member.

28. Multi-lumen hose or communicating anesthesia gas or breathing gas such as oxygen to a patient and for communicating exhalation gas away from the patient, comprising:
    a longitudinally extending tubular member;
    at least one substantially planar longitudinally extending colored inner partition residing interiorly of and formed integrally with said tubular member;

said tubular member and said colored inner partition providing a plurality of lumen for communicating the anesthesia gas or breathing gas such as oxygen to the patient and for communicating exhalation gas away from the patient; and said tubular member being at least substantially transparent to permit said colored inner partition to be seen by the eyes of a human being.

29. Multi-lumen hose comprising an at least substantially transparent tubular member provided with a substantially planar single colored inner partition formed integrally with and dividing said tubular member into a plurality of lumen and being optically perceptible through said tubular member.

30. The multi-lumen hose according to claim 29 wherein said single colored inner partition is disposed diametrically with respect to said tubular member.

31. The multi-lumen hose according to claim 29 wherein said single colored inner partition is irregularly shaped in end view.

32. The multi-lumen hose according to claim 29 wherein said single colored inner partition is S-shaped in end view.

* * * * *